United States Patent

Hoppenstein et al.

[11] Patent Number: 6,061,424
[45] Date of Patent: May 9, 2000

[54] STEREOSCOPIC IMAGES USING A VIEWING GRID

[76] Inventors: Reuben Hoppenstein, 200 Lyncroft Rd., New Rochell, N.Y. 10804; David Gifford Burder, 31 The Chine, Grange Park, London, United Kingdom

[21] Appl. No.: 08/729,649

[22] Filed: Oct. 21, 1996

[51] Int. Cl.[7] ..................................................... G21K 4/00
[52] U.S. Cl. ............................................ 378/41; 378/162
[58] Field of Search ........................ 378/41, 42, 162–164

[56] References Cited

U.S. PATENT DOCUMENTS

| | | |
|---|---|---|
| 3,783,282 | 1/1974 | Hoppenstein . |
| 3,848,136 | 11/1974 | Seldin ...................................... 378/164 |
| 5,049,987 | 9/1991 | Hoppenstein . |

Primary Examiner—Craig E. Church
Attorney, Agent, or Firm—Lieberman & Nowak, LLP

[57] ABSTRACT

Method and apparatus for stereoscopic images using a viewing grid and not requiring a lenticular viewing screen. In one embodiment applied to roentgenography, the apparatus includes an X-ray source, a table or cradle disposed beneath the X-ray source for securing an image subject such as a patient, and a recording medium cassette disposed beneath the table or cradle. The cassette includes a film comprising a base, an emulsion on a first side of the base and a viewing grid on an opposite second side of the base, an image intensifying screen for exposing the emulsion films for recording an image, and a recording grid located between the phosphorous screen and the emulsion side of the film, and fixed in position relative to the image intensifying screen for masking a plurality of strips of predetermined width, of the emulsion film. During exposure, relative movement between the cradle and cassette is maintained so as to capture various views of the image subject on the emulsion film. Where tomographic images are recorded, frontal and rear view stereoscopic images can be visualized on opposite sides of the film, respectively.

5 Claims, 3 Drawing Sheets

A = APPERTURE
GL = GRID LINE       } WIDTH OF LENTICULE (L)
L = A + GL

STEREOSCOPIC IMAGES USING A VIEWING GRID

FIELD OF THE INVENTION

This invention generally relates to stereoscopic images and specifically concerns novel techniques and apparatus for viewing such images including radiographs, providing an illusion of depth to the viewer.

DESCRIPTION OF THE PRIOR ART

The production of a standard radiograph or so-called X-ray is a relatively simple technique requiring merely the generation and transmission of a burst of electromagnetic radiation to and through a target or subject, the radiation burst thereafter impinging upon and exposing a fixed film record. Shadow images and the like are produced on the film record in dependence upon and in direct relation to various characteristics of the subject or target through which the radiation was transmitted. The film record or image so produced is, of course, twodimensional, much like a standard photograph.

In many investigative applications, however, both in the medical and other environments, these standard two-dimensional or planar radiography techniques are not entirely satisfactory. Many attempts have been made to develop three-dimensional radiography techniques generating a film or viewing record exhibiting the illusion of drawing depth. While the general concept of stereographic radiography and stereoscopic images in general is not new, adequate and commercially usable techniques and apparatus for producing and viewing such stereoscopic records have yet to be fully developed.

Many of the modern day techniques use lenticulated images to create stereoscopic images. These techniques are limited in that they require the use of a lenticular viewing lens to visualize the stereoscopic image. In general, stereoscopic photographs of an object can be made by exposing a photographic film record through a lenticular screen with attendant relative movement between the camera lens, the object, and/or the film to provide a lenticulated or strip-like base image, each strip-like image being representative of a different viewing angle of the object being photographed. When the resulting exposed base film image is viewed through a lenticular screen having suitable optical characteristics, the picture seen will appear to have depth and will generally have stereoscopic characteristics, regardless of the viewing angle.

In addition to depth, stereoscopic images can be used to convey a time sequence of images. For example, a sequence of ten x-ray exposures, each separated by 1/10 of a second, can be combined to produce a short movie. If during exposure the film is moved on its vertical or horizontal axis so that each of the ten exposures captures a different view of the patient, a time sequence of physiological events occurring within the patient can be viewed from a single x-ray film.

In U.S. Pat. No. 3,783,282, (the '282 patent) issued to Dr. Hoppenstein on Jan. 1, 1974 and entitled "Stereoscopic Radiography Techniques and Apparatus," hereby incorporated by reference as if fully set forth herein, a method and apparatus for stereographic radiography are described wherein a conventional x-ray source is used as a source of radiant energy. A patient is placed upon a moveable x-ray table which is designed to move through an arcuate path to present different positions and angles of the patient to incoming x-ray energy. A film cassette is disposed beneath the patient, containing a film, and a grid-like arrangement disposed above the film, which grid performs a lenticular lens function for the x-ray source. During exposure, the grid-like arrangement serves to generate a plurality of lineated images on the underlying x-ray film, which images can be viewed to present an illusion of depth and a three-dimensional effect through the use of a conventional lenticular optical screen.

In a later patent, U.S. Pat. No. 5,049,987 (the '987 patent), issued to Dr. Hoppenstein on Sep. 17, 1991 and entitled "Method and Apparatus for Creating Three-Dimensional Television and Other Multi-Dimensional Images," hereby incorporated by reference as if flilly set forth herein, the techniques of the '282 patent were extended to apply to the fields of Fluoroscopy, Computerized Axial Tomographs, Magnetic Resource Imaging, Television, Movies and the three dimensional display of other types of visual images.

The techniques described in both the '282 patent and the '987 patent are limited by the required use of a lenticular viewing screen positioned in proper alignment with respect to the subject image, to appreciate the stereoscopic view. Moreover, the use of this screen is time consuming, costly and adds bulk to the recorded images, thus requiring additional image storage space.

SUMMARY OF THE INVENTION

Accordingly, the present invention provides a novel means and technique for using the same, for viewing stereoscopic images. Specifically, the lenticular lens viewing screen required in the prior art is replaced with a viewing grid of alternating light absorbing lines and light transmitting lines.

In one advantageous embodiment the viewing grid of the present invention is printed on one side of an x-ray film having an emulsifier on an opposite side. The viewing grid side and emulsifier side are separated by a light transmitting film base having a predetermined thickness. After exposing the film to the image of the subject, the resulting image appears on the film as a three or four dimensional image, without additional viewing devices.

In another embodiment the viewing grid of the present invention can be used for viewing a three dimensional image transmitted as in fluroscopy or when on a television screen, if the signal was produced with the camera as described in the '987 patent. In this embodiment the viewing grid can be formed on a cathode ray oscilloscope lens, or on a liquid crystal diode ("LCD") screen by turning selected LCD pixels to their off state. A television set equipped with an LCD viewing grid can be used to view conventional two dimensional programs by turning off power to the LCD viewing grid.

DETAILED DESCRIPTION OF THE INVENTION

Figure 1:
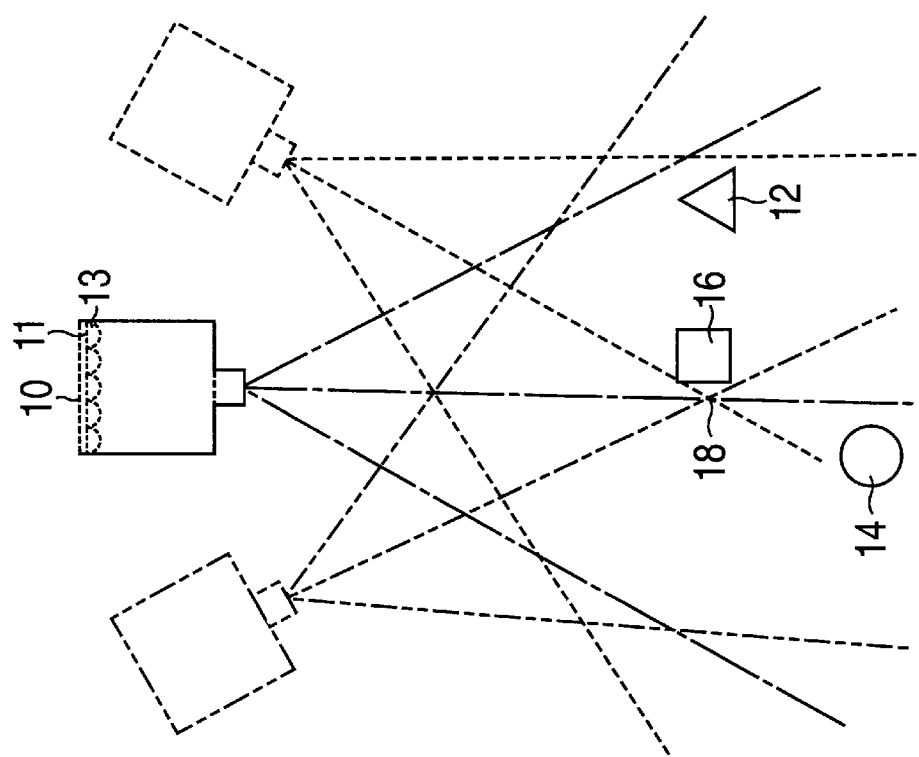
FIG. 1 is a prior art schematic illustration of a prior art optical technique for obtaining a film record containing parallax and providing a visual depth effect, as already discussed.

Typical prior art cameras for obtaining stereographic photographs are well-known and are schematically indicated in Prior Art FIG. 1. They generally comprise a standard commercial camera 10 mounted on a suitable non-illustrated structure for traversing a path about one or more subject images 12, 14 and 16, film 11, and an overlying lenticular screen 13. As shown in FIG. 1, camera 10 is capable of being moved between dotted-line positions along an arc whose radii intersect at point 18, the central point of any particular picture to be taken. The different relative positions of the camera while photographing the object, or the difference in point of view, i.e., parallax, of the camera as it traverses its arc is illustrated by the rays extending from each of the cameras. The relative rays are designated by dotted lines with respect to the left position of the camera, by solid lines with respect to the central position of the camera, and by dash lines with respect to the right position of the camera. It should therefore be noted that with this arrangement, camera 10 will view the objects 12, 14 and 16 from different points of view as the camera traverses its arcuate path.

Figure 2:
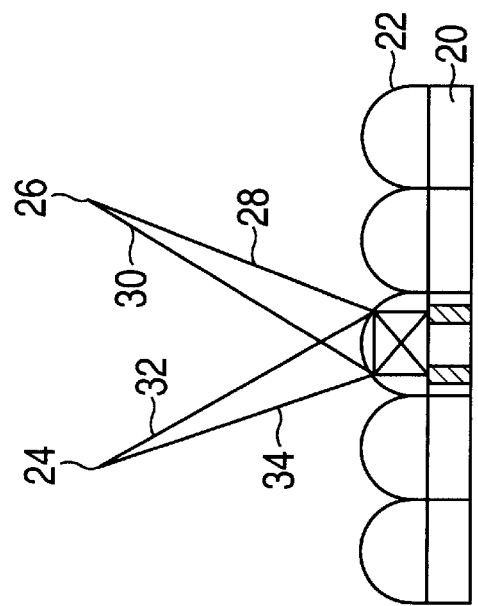
FIG. 2 is a prior art schematic illustration of a film containing a plurality of discrete images providing depth information, and an overlying lenticular screen so as to enable observation of the film record from virtually any angle, as above-discussed.

Lenticular screen 13, positioned between the camera lens and film 11, must be sequentially moved along with movement of camera 10 between the two end points of the arcuate path. By virtue of the refractive and focusing characteristics of the lenticle elements of lenticular screen 13, light received by the camera lens and passing to the screen 13 will be focused onto a given vertical line of film 11 behind each lenticle and, as the screen moves, this vertical line also moves so as to produce the lenticulated image on film 11. The developed film is illustrated at 20 in prior art FIG. 2. What will be stored, then, on the camera film, is a plurality of lenticuiated images or strips of the objects 12, 14 and 16, each viewed from a different angle and thus containing what can be termed parallax.

In the prior art, a stereoscopic view of the image could only be seen through a superimposed plurality of lenticles forming a viewing screen 22, similar to screen 11. The present invention eliminates the undesirable lenticular viewing screen and replaces it with a viewing grid having alternating light absorbing lines and light transmitting lines.

Figure 3:
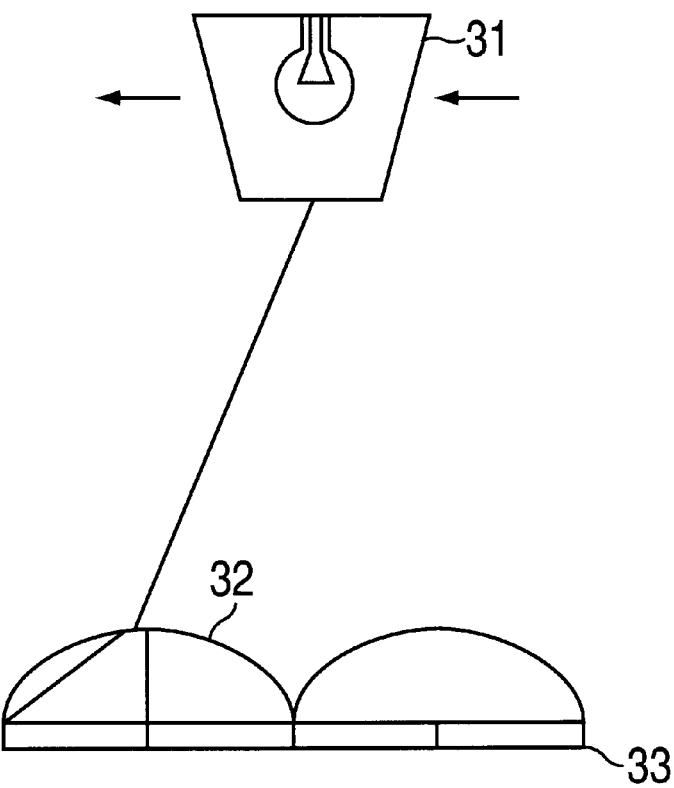
FIG. 3 illustrates the method of printing the viewing grid of the present invention on a film.

In one embodiment further described below, the viewing grid is printed directly on one side of an x-ray film so that immediately after developing the film the recorded image can be viewed with stereoscopic characteristics without requiring an additional viewing screen. Referring to FIG. 3, the viewing grid can be printed on film 33 by means of a slit light 31 and lenticular lenses 32 used to expose an area of film 33 corresponding to the number of views to be combined. As the viewing grid for the film must be identical to the lenticuiar recording screen 11 or the recording grid as described below, both the viewing and recording grids should be created from the same lenticular lens setup. Alternatively, the viewing grid can be superimposed on the x-ray film by directly printing alternating light absorbing lines and light transmitting lines on the film with any conventional printing method using ink having the appropriate light absorbing or light reflecting property. In particular, computer implemented software can be used to print alternating lines with precise dimensions on the film.

In FIG. 3, a grid is formed for a two view stereoscopic film. If only two views are to be combined, as depicted in FIG. 3, half the recording film 33 is exposed. To combine three views, two thirds of film 33 is exposed and for fours views, three quarters of film 33 is exposed. The number of images can vary according to the requirements of the study. While, at least two differing views are necessary for a three dimensional effect, a preferred range of views is between two and ten.

Figure 4:
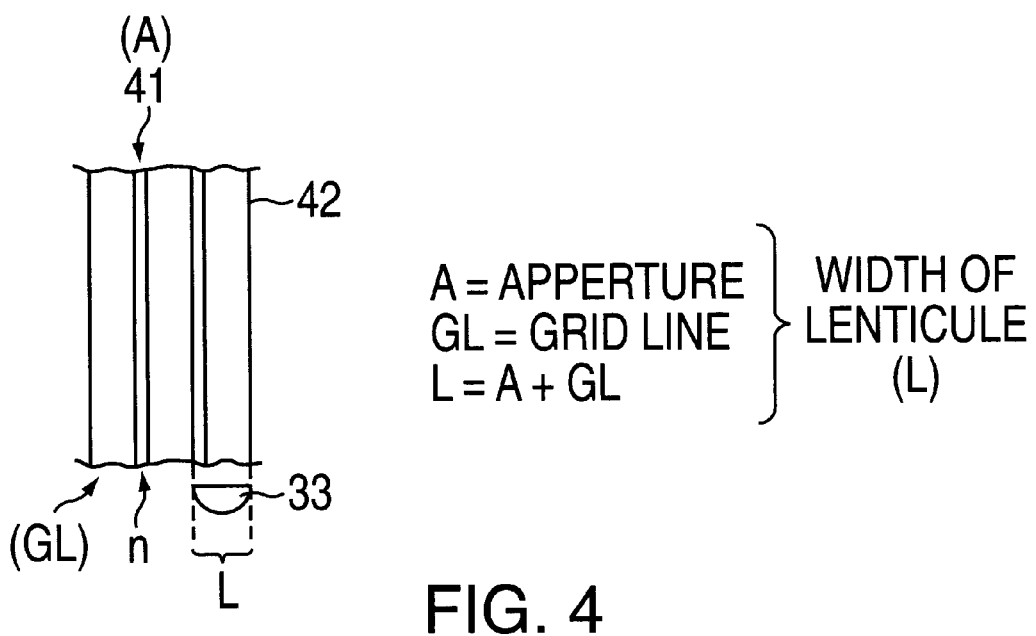
FIG. 4 illustrates the relationship between the lenticular lens for forming a viewing grid and the respective widths of the alternating light absorbing and light transmitting lines.

Referring to FIG. 4, the combined width of a pair of adjacent light absorbing and light transmitting lines is referred to as the grid line width. The width L of lenticular lens 33 used to form the viewing grid of the present invention should be made equal to the product of the number of views to be seen N and the aperture, or light transmitting line width A. For example, a 0.5 mm aperture width A will combine two views using a one millimeter lenticular lens.

The viewing grid of the present invention has the same effect as the prior art lenticular screen, in that the viewer simultaneously sees separate images of the same picture differing in point of view by the respective eyes of the viewer, giving rise to a three-dimensional illusion. Similarly, if during the creation of multiple images, movement occurs, such as the beating of a heart in a chest x-ray, then on the finished picture, a short time sequence will result.

Figure 5:
FIG. 5 is a schematic illustration, of one embodiment of the present invention as applied to an x-ray apparatus.
Figure 5:
Figure 5:
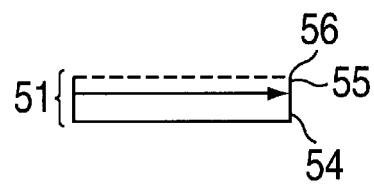
Figure 6:
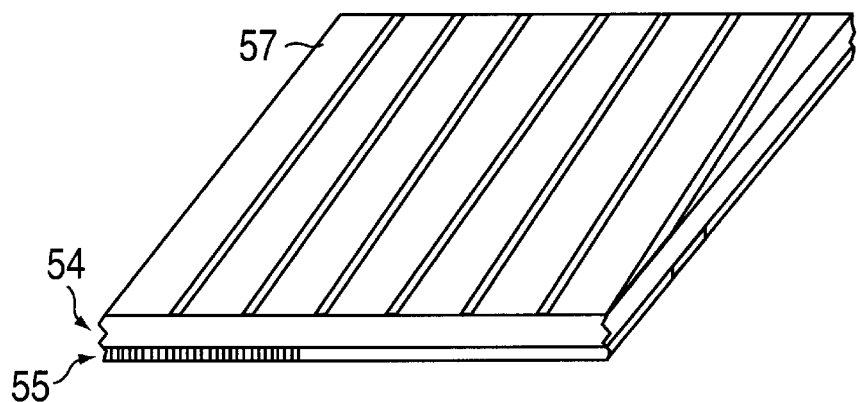
FIG. 6 further illustrates the embodiment of FIG. 5.
Figure 7:
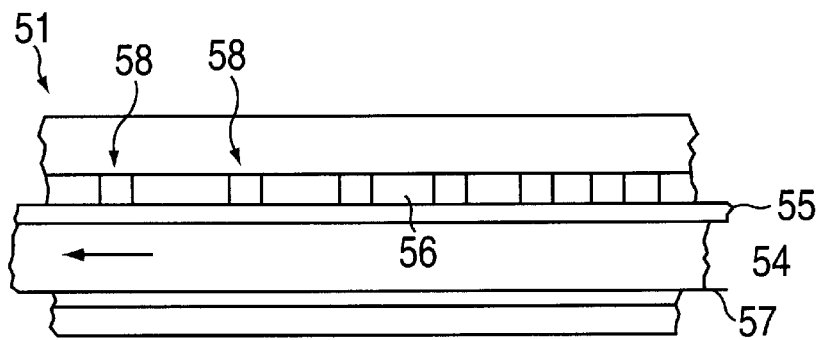
FIG. 7 illustrates the viewing grid of the present invention as shown in FIG. 6, when housed in an x-ray film cassette.

One advantageous application of the viewing grid of the present invention relates to a technique for forming and viewing stereoscopic images utilizing x-rays, described in the '282 patent. Referring to FIGS. 5–7, a recording cassette 51 disposed beneath a patient on a cradle 53 contains a transparent film base 54, and a recording screen or grid-like arrangement 56 disposed in a position above or adjacent the film. While conventional x-ray films, are covered by emulsion on both sides, in this embodiment only one side of the film base, the side applied by pressure to an image intensifying screen with the recording grid imbedded on its surface, has emulsion 55. The opposite side of the film is printed with viewing grid 57 described above, either during its manufacture or when the exposed x-ray is developed. As the perceived depth of the recorded image is related to the thickness of the film base, the thicker the base, the more depth the image will appear to have. A preferred base thickness however, is not greater than 1.0 mm.

The intensifing screen 58 is positioned above the film base and adjacent with the emulsifier side, and is typically constructed of florescent materials, such that when the incoming radiation burst impinges thereon, secondary emissions of photons will be effected. Recording grid 56 is provided between the emulsifier side of the film base and the intensifying screen, identical in construction to viewing grid 57 so that the various slots therein are in absolute alignment with one another. By so utilizing a screen image intensifying layer and recording grid, the incident x-ray radiation which passes through the film base 54 strikes the underlying image intensifing layer and is reflected back through the grid to the film base 54 to expose the emulsion.

The recording grid and image intensifing screen combination can also be formed by cutting precise masking grooves in a fluorescent sheet and fill them with a radio opaque substance. Alternatively, exposure grooves can be cut into a metal shield plate and filled with a fluorescent substance.

For tomographic cuts, the patient on cradle 53 and the film cassette 51 are in continuous relative opposing motion. In order for tomographic cuts to be made through the body, two of three actions must occur. The x-ray source 52 and the film must rotate around the patient while the x-ray beam is fired stacatto or in one continuous scan, the x-ray source 52 and the patient rotate while the film is stationary, or the x-ray source 52 is stationary while the patient and the film move in opposite directions. The latter option has the advantage that any conventional x-ray machine can be used for creating stereographic image or recording film manufactured in accordance with the present invention. In either case a plurality of lineated images are obtained on the underlying x-ray film. The exposed x-ray film now containing a plurality of continuous laminographic images, each image composed of a number of lenticulated lines representing different angles of view of the target, can be viewed through the utilization of a viewing grid as discussed above.

Since the sequence of cuts will be produced from in front to back, a series of cuts will be produced from the patient's anterior to his posterior. A series of four (4) cuts will yield two sets of stereoscopic pairs. When the stereoscopic image on the film is observed from one side, pairs 1 and 3, and 2 and 4 project a frontal view of the patient. When the image is observed from the opposite side, a posterior view of the patient results as now the pairs are viewed in reverse order of exposure. It is essential that the cuts be made in a tomographic manner, meaning, if the body is not moving at the time of exposure, the relative depths of the body will not be recorded and a true rear or posterior view will not result.

The disposition and spacing of the alternating light absorbing lines and light transmitting lines is predetermined. For example, with a standard 8 inch by 10 inch radiographic film, 500 separate apertures will be seen to cover the narrow dimension or 850 separate apertures could be utilized over a 14 inch by 14 inch plate. In accordance with well known optical principles, with a 10-exposure film, for example, each aperture will be seen to reduce the image that strikes it to a narrow strip 0.04 millimeter wide.

During exposure with the novel system, and in the preferred embodiment, the film itself is moved 0.04 millimeter in a direction opposite to that of the patient, being rotated in the cradle. This brings a new 0.04 millimeter wide strip into focus to receive the second image, while the rotation of the patient provides a new viewpoint for this image. After ten images are exposed, for example, and the patient has been rotated through an arc from between minus seven and minus fifteen degrees to between plus seven and plus fifteen degrees with respect to a midline position, the film is removed from the cassette and developed. Since the viewing grid of the present invention is printed on the film, the stereoscopic recorded image can be viewed without any additional viewing equipment, other than a light source behind the film.

In general the present invention can be applied for viewing any printed composite image, such as photographic, lithographic or laser print, on one side of a transparent base by printing the viewing grid of the present invention on the other side of the transparent base. Note that since the viewing grid obscures some of the light transmission, a bright light is necessary for clear viewing.

Similarly, a viewing grid placed in front of or behind the screen of a cathode ray oscilloscope (CRT) or a viewing grid placed in front of or behind an LCD screen would also enable viewing a stereoscopic transmitted image in three or four dimensions. As explained above, in order for the image to appear to have depth the viewing grid must be spaced from the screen. Any transparent material such as glass or plastic can separate the viewing grid from the screen.

Additional applications for the viewing grid of the present invention include viewing multiple images created by different studies such as computerized axial tomography (CAT), magnetic resonance imaging (MRI), or positron emitting technology (PET). These images or cuts would need to be spaced ¼ degree to ½ degree apart when produced and then combined electronically, digital or analog, as described in the '987 patent.

Indeed, a composite image can also be created from the combination of images taken from different studies. For example, since CAT scans produce bony landmarks and MRI scans produce excellent soft tissue images, the two can be combined on a single three or four dimensional image, giving accurate coordinates for a physician for stereotactic manipulation or surgery. In addition, physiological studies done on PET scans can also be incorporated. For example, two views from a CAT scan giving bony landmarks, four cuts from an MRI showing soft tissue, and if necessary, two cuts from a PET scan showing metabolic activity, can all be combined on one picture, provided of course that the images are of the same size and the correct angles have been recorded. Furthermore, stereoscopic images of diagnostic studies, such as angiograms, movement of a joint, and the beating of a heart, recorded as described in the '987 patent or other like means, can be viewed with the viewing grid of the present invention.

The foregoing merely illustrates the principles of the present invention. Those skilled in the art will be able to devise various modifications, which although not explicitly described or shown herein, embody the principles of the invention and are thus within its spirit and scope.

What is claimed is:

1. An x-ray film, for providing three dimensional viewing of the x-ray film by simulating the action of a lenticular lens without the lenticular lens being present, comprising:

a film base having a predetermined thickness separating a first side and a second opposite side;

an emulsion on said first side; and a viewing grid permanently disposed on said second side, wherein said viewing grid comprises alternating light absorbing and light transmitting lines having an aperture width A equal to L/N. where L is the width of the simulated lenticular lens and N is the number of views of an image provided by the simulated lenticular lens, and each of said light absorbing lines having a width equal to L-A.

2. A film according to claim 1 wherein said film base is transparent and said film base thickness is not greater than 1.0 mm.

3. An x-ray film cassette for providing three dimensional viewing of the x-ray film by simulating the action of a lenticular lens without the lenticular lens being present, comprising:

a film base having a predetermined thickness separating a first side and an opposite second side;

an emulsion on said first side;

a viewing grid permanently disposed on said second side;

wherein said viewing grid comprises alternating light absorbing and light transmitting lines having an aperture width A equal to L/N, where L is the width of the simulated lenticular lens which would provide N views of an image when viewed therewith and each of said light absorbing lines having a width equal to L-A;

a recording grid; and an image intensifier, said recording grid and image intensifier being located adjacent to said first side.

4. A cassette according to claim 3, wherein said recording grid and said image intensifier are formed from a flat metal shield having an array of image intensifier grooves filled with a phosphorous substance.

5. A cassette according to claim 3 wherein said recording grid and said image intensifer are formed by a flat phosphorous surface having an array of masking grooves filled with a radio opaque substance.

* * * * *